United States Patent [19]

Berezin et al.

[11] 4,257,269
[45] Mar. 24, 1981

[54] METHOD AND APPARATUS FOR PRODUCING VISIBLE IMAGE OF OBJECT

[75] Inventors: Ilia V. Berezin; Viktor S. Goldmakher; Alexandr M. Klibanov; Karel Martinek; Alexandr A. Mishin; Gennady P. Samokhin; Vladimir N. Smirnov; Vladimir P. Torchilin; Evgeny I. Chazov, all of Moscow, U.S.S.R.

[73] Assignee: Vsesojuzny Kardiologichesky Nauchny Tsentr Akademii Meditsinskikh Nauk SSSR, Moscow, U.S.S.R.

[21] Appl. No.: 926,324

[22] Filed: Jul. 20, 1978

[30] Foreign Application Priority Data

Jul. 20, 1977 [SU] U.S.S.R. ............................. 2502751
Jul. 20, 1977 [SU] U.S.S.R. ............................. 2502752

[51] Int. Cl.³ .................... G01N 29/00; G03D 13/00
[52] U.S. Cl. .......................................... 73/606; 430/3
[58] Field of Search .................... 73/603, 606; 430/3; 367/7, 8

[56] References Cited

U.S. PATENT DOCUMENTS 2,803,128  8/1957  Petermann ........................... 73/606
3,097,522  7/1963  Weller, Jr. ........................... 73/606

OTHER PUBLICATIONS

P. J. Ernst, "Ultrasonography," *Journal of the Acoustical Society of America*, vol. 23, No. 1, pp. 80-83, Jan. 1951.

*Primary Examiner*—Stephen A. Kreitman
*Attorney, Agent, or Firm*—Fleit & Jacobson

[57] ABSTRACT

A method for producing a visible image of an object is disclosed in which a fermental plate is illuminated with ultrasonic waves and a latent image of the object is therefore produced therein which is developed using a solution of chromogenic substrates, comprising, for example, hydrogen peroxide and a water-soluble aromatic amine. An apparatus to practice the disclosed method comprises an ultrasonic generator to generate ultrasonic waves illuminating the object, a fermental plate to receive and convert the ultrasonic waves passed through the object to a visible image, and a tray filled with a developer to develop the latent image of the object in the fermental plate.

4 Claims, 3 Drawing Figures

METHOD AND APPARATUS FOR PRODUCING VISIBLE IMAGE OF OBJECT

FIELD OF THE INVENTION

The invention relates to techniques for investigation and analysis of the structure of objects, and more particularly to methods and apparatus for producing visible images of objects.

The invention is applicable for use in all fields of industry dealing with the production of quantitative data on the internal structure of objects, including metallurgy, manufacture of building materials and other construction material, etc.

In particular, the invention is especially suitable for medical diagnosis work where visualization of the internal organs of patients is necessary.

DESCRIPTION OF THE PRIOR ART

Known in the art is a method of producing the image of the internal structure of an object using ultrasound. This method is based on the principle that a beam of ultrasonic waves is reflected from the interface of two media of different physical structure. If such a beam is directed on to an object, data on the internal structure of the object can be obtained.

The present-day apparatus for investigation of the internal structure of objects with the help of ultrasonic waves utilize piezocrystals that serve as ultrasonic detectors to convert ultrasonic waves to weak electric oscillations. However, a single piezocrystal operating in conjunction with a respective electric circuit incorporating it and with an amplification circuit as well is able to produce only a single-point image. Multipoint images can be produced using either a mosaic arrangement of piezocrystals, in which each individual piezocrystal has its own amplification circuit, or a scanner. In either case, the produced image comprises a smaller number of points and therefore offers a poor information capability. Increasing the number of points of an image results in a drastic sophistication of associated electronic circuitry, which makes the apparatus cumbersome and costly.

There is a medical diagnostic ultrasonic device, Type Sonograf III (cf. a brochure issued by the Unirad Corporation, 1975), in which piezocrystals serve as an ultrasonic detector and the image is produced on a screen using a scanning method. The device makes it possible to produce the images of the internal organs of patients with a poor resolution about one centimeter. It is a cumbersome and very costly data processing apparatus with image output, which is difficuilt to operate.

Known in the art are methods of producing data on the structure of objects, which utilize other types of radiation (cf. the USSR Inventor's Certificate No. 439,780, Int.Cl.GO3C 1/72 with title "Method of Producing Photographic Images"). This method provides for the production of images on a fermental plate with a coating sensitive to ultraviolet radiation. The fermental plate is a base layer on which a a cis-cinnamoyl derivative of a proteolytic ferment is deposited; under the influence of ultraviolet radiation this ferment forms an active catalyst. When the feremental plate is illuminated with ultraviolet rays, there is formed, at the locations that receive ultraviolet rays, an active catalyst producing coloration during further processing with a chromogenic substrate. The locations on the fermental plate not receiving ultraviolet radiation due to the shadows from the object are given no coloration with the result that a visible image of the object is produced.

The method utilizes a substrate which is $\beta$-naphthyl ester of N-acylated L-amino acid. This substrate acts with the ferment to form a water-soluble $\beta$-naphthol. At an exposure time exceeding one minute, this gives a partially blue-red image whose sharpness, resolution and information capability are poor.

Another disadvantage of the method is that it utilizes a fermental plate which is sensitive to ultraviolet radiation only.

It is known that many objects cannot transmit ultraviolet radiation and their internal structure cannot be therefore investigated using these rays. A convenient way-out is the use of ultrasonic waves in this case.

SUMMARY OF THE INVENTION

An object of the invention is to provide a method of producing a visible image of an object, which method produces the images characteristic of both the external and internal structure of the object when the latter is illuminated with ultrasonic waves.

Another object of the invention is to provide an apparatus to realize the proposed method of producing a visible image of an object and to provide the image of a higher resolution when the object is illuminated with ultrasonic waves.

A still another object of the invention is to provide an apparatus to realize the proposed method of producing a visible image of an object and to provide for the image offering a good mechanical strength.

Another object of the invention is to provide an apparatus which is simple to operate and which has no electronic circuitry.

There is disclosed a method of producing a visible image of an object, in which a fermental plate is treated with the help of steps including exposure, production of a latent image of the object and development, which method comprises, according to the invention, the illumination of the fermental plate with ultrasonic waves and further developement of the latent image so produced by means of a solution comprising hydrogen peroxide and a water-soluble chromogenic aromatic amine.

There is further disclosed an apparatus to practice the proposed method of producing a visible image of an object, in which a there are provided an ultrasonic generator and a detector to receive and convert ultrasonic waves to a visible image of an object, which apparatus is provided, according to the invention, with a detector which is a fermental plate producing a latent image of the object and having a structure sensitive to ultrasonic waves, and a means to develop the latent image.

Advantageously, the apparatus of the invention has a fermental plate with a multilayer structure, the external layers of the fermental plate being formed from a hygroscopic material, one of the external layers being provided with a fermental solution, and an intermediate layer of the fermental plate being formed from a cellular material with cells from 0.05 to 0.5 mm in size, and the means to develop the latent image being a tray filled with a developer.

Preferably, the apparatus of the invention has one of the external layers of the fermental plate provided with a fermental solution belonging to the group of oxyreductases.

It is advantageous that the apparatus of the invention has the intermediate layer of the fermental plate formed from a cellular material with a multilayer structure.

The proposed method makes it possible to produce a visible image of the internal structure of the object.

According to the method, the image of the object produced on the fermental plate has a good mechanical strength.

The proposed apparatus and its fermental plate provide an image of an object illuminated with ultrasonic waves which have no health hazard. The apparatus of the invention produces images of good resolution, is simple to operate and requires no electronic circuitry which would produce a visible image from a latent image of the object.

DESCRIPTION OF THE DRAWINGS

The invention will now be described, by way of example, with reference to the accompanying drawings in which.

DESCRIPTION OF THE INVENTION

Figure 1:
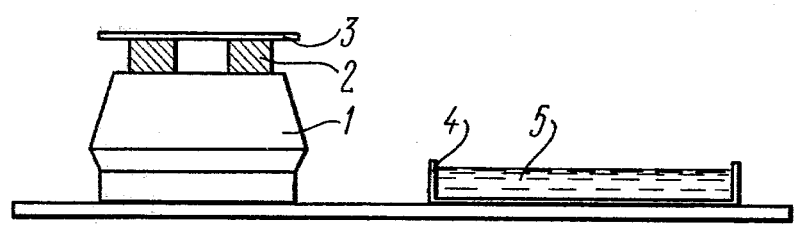
FIG. 1 is a diagrammatic representation of an apparatus to realize a method of producing a visible image of an object, according to the invention.

The apparatus of the invention comprises an ultrasonic generator 1 (FIG. 1) which produces ultrasonic waves to illuminate an object 2 (a metallic nut). The detector to receive and convert ultrasonic waves to a visible image of the object 2 is made in the form of a fermental plate 3 sensitive to ultrasound and a means to develop the latent image, which is a tray 4 filled with a developer 5. The latter is used to develop the latent image produced in the fermental plate 3. The developer 5 is a solution containing chromogenic substrates, for example, a solution containing hydrogen peroxide and a water-soluble chromogenic aromatic amine.

Figure 2:
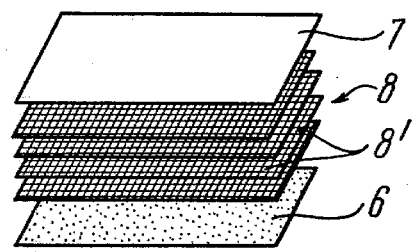
FIG. 2 is a view of a fermental plate, according to the invention.

FIG. 2 illustrates diagrammatically the fermental plate 3. External layers 6 and 7 of the fermental plate 3 are made of a hygroscopic material. One of the external layers 6 and 7, for example, the layer 6, is impregnated with a fermental solution (shown by dots in the drawing) belonging to the group of oxyreductases, for example, peroxidase. In the described embodiment, the external layer 6 is a donor layer.

An intermediate layer 8 of a multilayer cellular material is deposited on the external layer 6 in intimate contact with the latter. Cells 8' are from 0.05 to 5 mm in diameter; the material is provided, for example, by 3 to 30 layers of gauze of a suitable tissue. The intermediate layer 8 is soaked with water. The external layer 7, which is an acceptor layer for the ferment, is soaked with water and is able to reliably adsorb the ferment by its surface.

Figure 3:
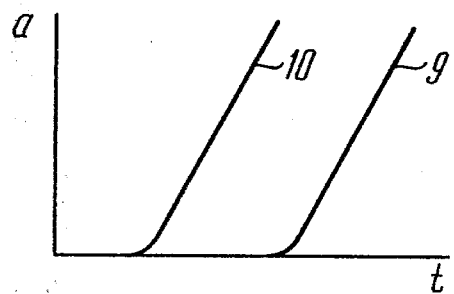
FIG. 3 is a graph to show a relationship between ultrasonic waves and the speed of transfer of the ferment over the fermental plate, according to the invention.

A graph of FIG. 3 illustrates a process according to which the ferment is transferred from the donor layer to the acceptor layer. The time t, counted since the beginning of the incubation period, is plotted on the axis X while the amount a of the ferment transferred to the acceptor layer is plotted on the axis X. A curve 9 describes the transfer process in the absence of ultrasonic waves whereas a curve 10 describes the case in which the fermental plate 3 is illuminated with ultrasonic waves. It is evident that the presence of ultrasonic waves results in a faster transfer of the ferment from the donor layer to the acceptor layer.

Given below is a brief description of a method of manufacturing the fermental plate 3 (FIG. 1). The donor layer, for example a piece of filter paper, is soaked with a $10-10^{-4}$ mg/ml water solution of a ferment which belongs, for example, to the group of oxyreductases. In 10 to 60 seconds, the required number of layers of gauze soaked with water to form the intermediate layer 8 (FIG. 2) is placed on to the donor layer, namely, the external layer 6 in intimate contact with the latter. After that the external layer 7, soaked with water, is deposited on top of the structure to form intimate contact with it. The fermental plate 3 so obtained can be used for 20 to 90 min.

EXAMPLE

Six layers of gauze of a cellular material with the size of the cells 8' of 0.2 mm are soaked with water and fitted closely on the external layer 6 (donor layer) made of filter paper and soaked with a 0.01 mg/ml water solution of peroxidase. Placed on the top layer of gauze, in intimate contact with it, is a piece of filter paper soaked with water to form the external layer 7 (acceptor layer).

The apparatus of the invention operates in the following manner. Ultrasonic generator 1 (FIG. 1) produces ultrasonic waves which pass through the object 2 located in close proximity to the ultrasonic generator 1 and to the fermental plate 3 as well.

Depending on the internal structure of the object 2, the ultrasonic waves of different intensity act on the external layer (for example, the external layer 7) of the fermental plate 3, located in close proximity to the object 2. According to the intensity of the ultrasonic waves, different amounts of the ferment are subject to transfer and adsorption on the donor layer (the external layer 6) and the acceptor layer (the external layer 7) of the fermental plate 3. After that, the external layer 7 with the ferment adsorbed therein and bearing the latent information invisible to the eye is subject to the development process occurred in the tray 4 with the help of a chromogenic substrate. The latter may be, for example, a colorless aromatic amine which forms, under the action of the ferment and hydrogen peroxide, tinted reaction products which are insoluble in water.

The method utilizes the ferment belonging to the group of oxyreductases and the above-mentioned developer solution so that a properly tinted image of good mechanical strength is obtained.

Ultrasonic waves can pass through many objects which do not transmit ultraviolet radiation, such as the bodies of human beings and animals and metallic and other structures made of dense materials (concrete, plastic materials, wood, rock, etc.). Using ultrasonic methods of investigation, it is possible to obtain data on the internal structure of such objects which cannot be treated with ultraviolet radiation for the purpose.

Unlike ultraviolet radiation and X-rays, the ultrasonic waves produced by the apparatus of the invention at a low intensity level have not health hazard at all. The images provided offer high resolution and good mechanical strength.

The method and apparatus of the invention are simple to use and give good reproducibility of the results.

The disclosed method can be used for producing ultrasonic holograms. At present, ultrasonic holography is considered to be a useful method of obtaining space images of the objects which have a greater information capability as compared to two-dimensional images. These advantages are not employed up to now, however, since specialists cannot produce detailed ultrasonic holograms of good resolution on a flat plate. The present invention seeks to solve this problem in principle.

What is claimed is:

1. An apparatus comprising:
    an ultrasonic generator to generate ultrasonic waves illuminating an object;
    a detector to receive and convert the ultrasonic waves passed through the object to a visible image of the object, said detector being in the form of a fermental plate having a structure sensitive to said ultrasonic waves; and
    a means to develop said latent image.

2. An apparatus as claimed in claim 1, in which said fermental plate has a multilayer structure including external layers and an intermediate layer, said external layers of said fermental plate made of a hygroscopic material, one of said external layers containing a fermental solution, said intermediate layer of said fermental plate made of a cellular material having cells from 0.05 to 5 mm in size; and
    said means to develop said latent image comprising a tray filled with a developer.

3. An apparatus as claimed in claim 2, in which said one external layer of said fermental plate is provided with said fermental solution belonging to the group of oxyreductases.

4. An apparatus as claimed in claim 3, in which said intermediate layer of said fermental plate is made of said cellular material having a multilayer structure.

* * * * *